United States Patent [19]

Mains

[11] Patent Number: 5,408,907
[45] Date of Patent: Apr. 25, 1995

[54] TRAVERSING CIRCULAR SAW

[75] Inventor: Doug Mains, Starke, Fla.

[73] Assignee: Rhino Corporation, Waycross, Ga.

[21] Appl. No.: 97,565

[22] Filed: Jul. 26, 1993

[51] Int. Cl.⁶ .............................................. B27B 5/10
[52] U.S. Cl. .................................. 83/468.7; 83/471.2; 83/488; 83/490; 83/928; 83/DIG. 1; 144/379
[58] Field of Search ..................... 83/471.2, 483, 485, 83/486, 486.1, 487, 488, 490, 468.7, 928, DIG. 1; 144/379

[56] References Cited

U.S. PATENT DOCUMENTS

| | | | |
|---|---|---|---|
| 1,602,357 | 10/1926 | Georgelis | 83/486.1 |
| 2,823,710 | 2/1958 | Angel | 83/486.1 |
| 3,623,519 | 11/1971 | Radle | 83/471.2 |
| 3,832,928 | 9/1974 | Copeland | 83/468.2 |
| 4,187,990 | 2/1980 | Lundahl et al. | 83/490 X |
| 4,938,263 | 7/1990 | Wrightman | 144/379 X |

*Primary Examiner*—Richard K. Seidel
*Assistant Examiner*—Raymond D. Woods
*Attorney, Agent, or Firm*—Saliwanchik & Saliwanchik

[57] ABSTRACT

A traversing circular saw device comprising a saw blade assembly mounted onto a cradle to receive a number of logs to be cut into sections. The saw blade assembly comprises a circular saw blade mounted onto an extension arm which is contained within a pivoting arm sleeve. The width of the cradle is greater than the diameter of the saw blade. The saw blade is pivoted down into the cradle by a first piston, and the blade is then extended across the cradle by a second piston.

8 Claims, 3 Drawing Sheets

TRAVERSING CIRCULAR SAW

BACKGROUND OF THE INVENTION

This invention relates generally to the field of circular saws, and more particularly to the field of circular saws which move relative to the workpiece being cut. Even more particularly, the invention relates to large circular saws moved hydraulically in a pivoting and traversing motion relative to a workpiece receiving cradle, such as saws used in the logging industry to cut trees into short wood lengths.

There are numerous steps in bringing a tree from the forest to a mill for final processing into lumber, pulp, etc. Each tree is felled, delimbed and transported by truck to the mill. For some uses the logs are cut into short sections, usually from 4 to 8 feet in length. Cutting short wood, as it is known, may occur in the field prior to loading on the trucks, at intermediary wood yards for loading the wood onto trucks or rail cars, or at the mill itself. For increased speed, a number of logs are cut in a single pass with a large saw, rather than being cut individually. A motorized piece of heavy equipment known as a loader picks up several logs with a large grapple—a pincer type device—and loads them into the cradle or bunk of the saw. When the cradle is filled to the maximum allowable height, a hydraulically operated butt board evens the ends, the logs are cut by the saw and the short wood is removed by the grapple and placed on the truck or into train cars. The loader then uses the grapple to grasp and slide the remaining log lengths forward past the saw and the process is repeated.

There are three standard saws in use for this type of operation. The first type consists of an elongated chain saw typically 4 to 5 feet in length which pivots from a recessed vertical position just to one side of the cradle down to a horizontal position during the cutting stroke. The recessed position allows the logs to be moved in the cradle and protects the saw blade from damage. The other two types use circular saw blades of up to 5 feet in diameter. In one type, the blade is pivoted from a recessed vertical position down into the cradle, in a manner similar to the chain saw type. In the other type, the blade is mounted on a multi-jointed elbow-like arm which brings the blade from the recessed position across the cradle.

The circular saws are more powerful than the chain saw type, and the chain saw type cannot be used in northern locations on frozen trees. Additionally, the chain saw types are easily bound or stalled by the logs and breakage of the chain is common. The circular saws, powered hydraulically, can be used under all conditions. The primary drawback of the first type of circular saw described, which only pivots down onto the logs to be cut, is that the width of the cradle is limited by the size of the blade diameter. Since the blade must extend slightly beyond all the logs to make full cuts, the cradle must have a width smaller than the diameter of the blade and the depth of the cradle must be kept well below the center of the blade. Because the cradle size is limited, the amount of wood able to be cut with each pass is also limited. To utilize a wider cradle, and thereby increase the amount of wood able to be cut in a single pass, the second type of saw is known. This type of circular uses a jointed mechanism to hydraulically extend the saw blade across the cradle. The multi-jointed arm moves the blade across the cradle with an elbow-like action. Because of this mechanism, the saw blade is readily subject to binding and stoppage, since the multi-jointed arm is not strong enough to counter any shifting of logs against the blade. This forces the blade off-line and results in stoppage, requiring the operator to retract the blade and start over.

It is an object of this invention to provide a circular saw which can be pivoted down onto the logs in the cradle and then moved transversely across the cradle, such that the cradle width can be maximized. It is a further object to provide such a saw in which the blade is moved in a solid and controlled manner, whereby shifting logs will not bind and stop the blade's rotation. It is a further object to provide such a saw where the blade is moved hydraulically by two pistons, one to pivot the blade down from the recessed position and the other to reciprocate the blade across the cradle and back in a strictly linear motion.

SUMMARY OF THE INVENTION

The invention comprises a circular saw blade mounted onto a cradle for receiving a quantity of delimbed logs, the cradle providing a means to retain the logs while the saw blade cuts the log lengths into sections. The cradle is comprised of a number of generally vertical members mounted to generally horizontal base cross members to create a number of generally U-shaped retaining members. The U-shaped retaining members are spaced longitudinally to retain the logs in the cradle during operations. The latitudinal width of the cradle is greater than the diameter of the circular saw blade. The saw blade is movable relative to the cradle, having a fully retracted, recessed position to allow open access to the cradle for loading and shifting operations and a cutting movement comprising a downward arced pivot plus a lateral linear extension across the cradle for cutting the logs. The cradle extends longitudinally to receive the logs and the saw blade is mounted such that the cutting path is perpendicular to the longitudinal direction. The axis of rotation of the circular blade is parallel to the longitudinal axis of the cradle. The cradle extends longitudinally some length to either side of the blade, such that the cradle retains both the uncut and cut sections of the each log. A butt board is pivotally mounted on the cradle at the forward end to align the ends of the various logs. The butt board is operated hydraulically and is preferably adjustable in distance from the cutting path of the blade, such that short wood of different lengths can be cut.

The saw blade is connected to an extension arm which can be hydraulically extended from and retracted into an arm sleeve using an arm piston. The arm sleeve is pivotally connected to the cradle such that it can be pivoted radially from a horizontal position to a near vertical position by a hydraulic sleeve piston, thereby raising the extension arm and saw blade into a recessed position lateral to the cradle. With the blade in the recessed position, the cradle is loaded with logs, the butt board is raised to even the ends of the logs and then lowered. The saw blade, preferably powered by hydraulics, is pivoted down onto the logs—cutting the logs in the near side of the cradle—by retracting the sleeve piston controlling the arm sleeve. Once the full down position is reached, the arm piston controlling the extension arm is extended, thus extending the saw blade transversely across the cradle in a linear manner, cutting the logs on the far side of the cradle. After full extension, the arm piston is retracted to retract the extension arm back into the arm sleeve and the sleeve piston is extended to pivot the assembly back upward into the recessed position. The cut short wood is then removed by the grappler, the remaining log lengths are shifted down, the butt board aligns the ends if necessary and the process is repeated.

Preferably, the cradle and saw are mounted onto a wheeled trailer to allow the entire apparatus to be transported to any desired location. Also preferably, a protective tower is positioned above the saw blade to guard the components from accidental damage when the blade is in the fully retracted, recessed position. It is also preferable that all operations of the invention, including the operation of the butt board, the pistons and the blade itself, be accomplished hydraulically.

DETAILED DESCRIPTION OF THE INVENTION

Figure 1:
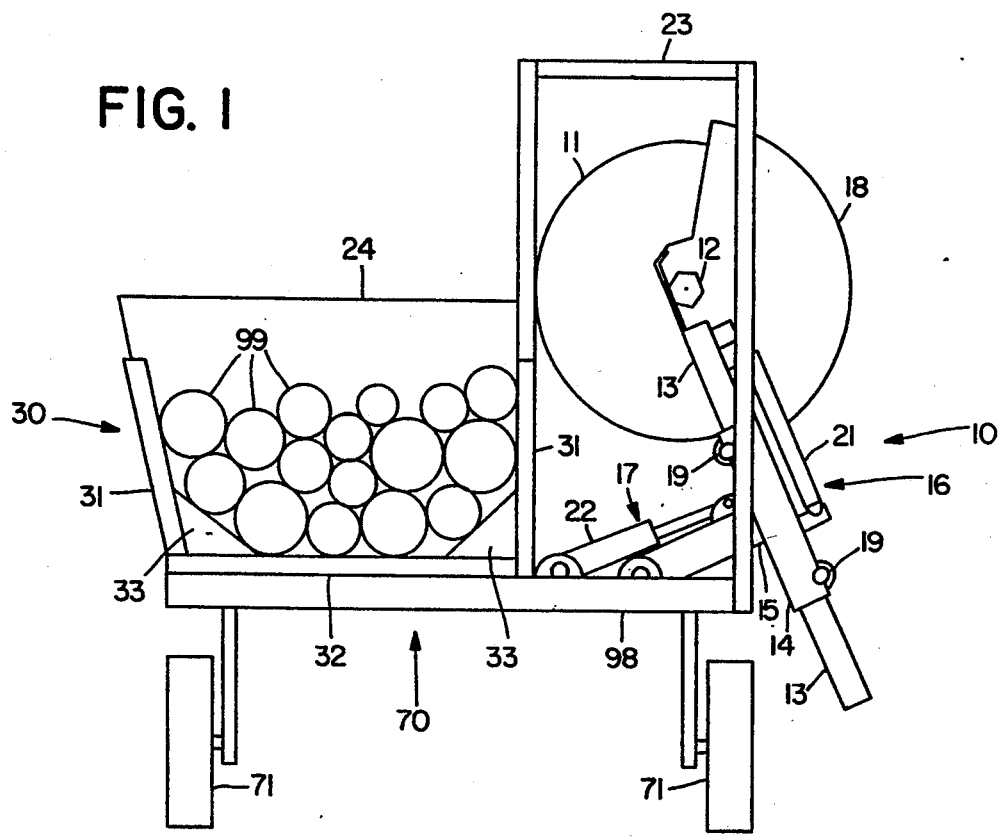
FIG. 1 is an end view of the invention.
Figure 2:
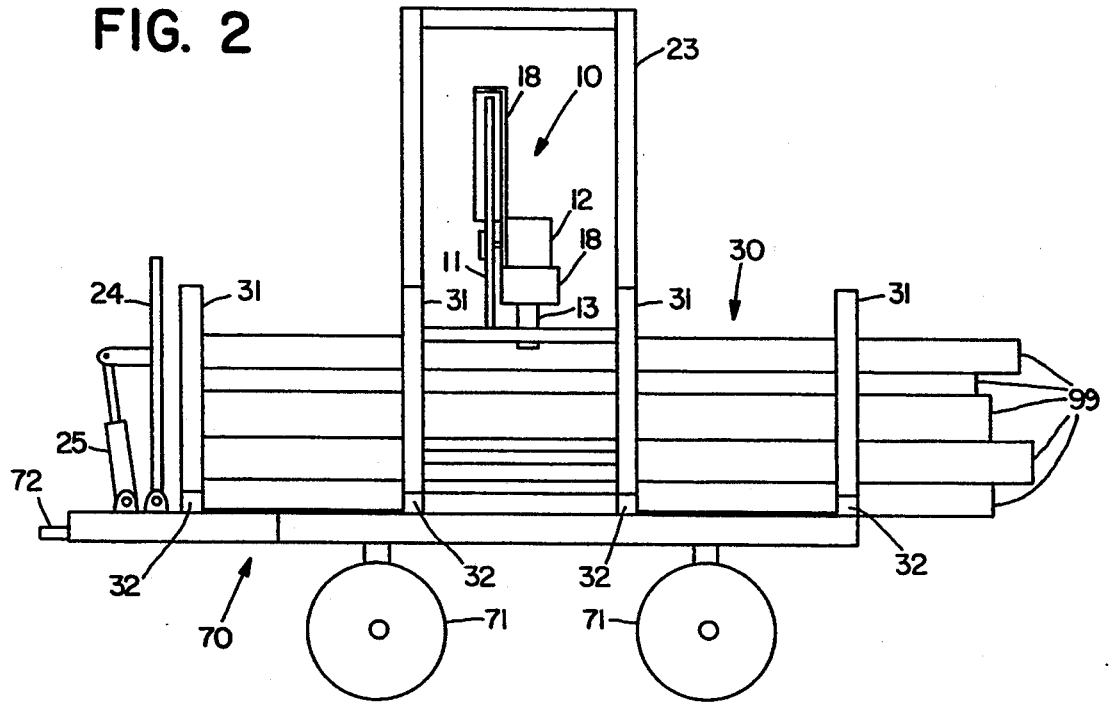
FIG. 2 is a side view of the invention.

With reference to the figures, the invention will now be described in detail, providing the preferred embodiment and best mode. As shown in FIGS. 1 and 2, the invention is an apparatus for cutting logs 99 into shorter segments for ease in handling, packing and transportation, comprising in general a circular saw blade assembly 10 mounted onto or connected to cradle means 30 for receiving the logs 99. Preferably the apparatus is mounted on or incorporates a trailer 70 having wheels 71 and attachment means 72 to connect the apparatus to a powered vehicle for moving the entire unit to any desired location.

Cradle means 30 is a receiving and holding means to retain the logs 99 in position during the cutting operation. Cradle means 30 also retains the cut segments of the logs 99 so that they can be removed by a grapple. Cradle means 30 extends longitudinally, such that the logs 99 are loaded lengthwise parallel to the longitudinal axis of the cradle means 30. Cradle means 30 can be constructed in various designs, provided a generally U-shaped channel in cross-section is formed. Preferably, cradle means 30 comprises a number of generally vertically oriented side members 31 mounted laterally in pairs along the length of the cradle means 30, with horizontal bottom members 32 connecting each opposing side members 31. Alternatively, bottom members 32 may be solid or apertured plates. The side members 31 are spaced a sufficient distance longitudinally to allow access to the logs 99 by a grapple for removal and placement. Corner plates 33 are inserted in each lower corner formed by the junction of a side member 31 and bottom member 32 to create the proper profile to position the logs 99 so that the circular saw blade 11 will extend slightly beyond each log 99 during the cutting operation. Preferably, cradle means 30 is formed of high strength steel members. The latitudinal width of cradle means 30 is greater than the diameter of saw blade 11.

Saw blade assembly 10 comprises in general a circular saw blade 11, drive means 12 to rotate saw blade 11, an extension arm 13, an arm sleeve 14, a pivoting support post 15, extending means 16 to move the extension arm 13 and pivoting means 17 to pivot the support post 15. Saw blade assembly 10 is mounted onto or connected to cradle means 30 such that saw blade assembly 10 is relatively centrally located longitudinally, as seen in FIG. 2. Laterally, saw blade assembly 10 is mounted onto or connected to cradle means 30 to one side, as seen in FIG. 1, such that the assembly 10 does not intrude into cradle means 30 when the assembly 10 is in the recessed position. The central rotational axis of saw blade 11 is parallel to the longitudinal axis of cradle means 30, such that the travel and cutting path of saw blade 11 is transverse or across cradle means 30 laterally, perpendicular to the longitudinal axis.

Saw blade 11 is a circular saw blade, preferably with removable cutting teeth. These blades are well known in the industry. Preferably, a large diameter blade, such as one with a diameter of five feet, is utilized. The blade 11 is rotated by drive means 12, which can consist of any type of motor, including gasoline or electric, but is preferably a hydraulic motor powered by the hydraulic system of the loader itself. Drive means 16 must provide sufficient rpm's to cut the logs 99, typically from 1200 to 1300 rpm's. Preferably, a housing shield 18 surrounds the non-cutting area of saw blade 11.

Saw blade 11 is mounted onto one end of extension arm 13. Extension arm 13 is preferably constructed of a straight steel beam, and slidingly fits within arm sleeve 14 such that extension arm 13 moves longitudinally relative to arm sleeve 14, the internal cross-section of arm sleeve 14 corresponding generally to the external cross-section of extension arm 13. Roller members 19 positioned between extension arm 13 and arm sleeve 14 reduce friction and provide a rotating bearing surface to allow extension arm 13 to be easily moved relative to arm sleeve 14 by extending means 16. Extension arm 13 is much longer than arm sleeve 14, and arm sleeve 14 has both ends open so that extension arm 13 can protrude from either end. Extending means 15 preferably comprises an arm piston 21 mounted parallel to the main axis of extension arm 13 and arm sleeve 14. One end of arm piston 21 is attached to the extension arm 13 and the other end of arm piston 21 is attached to the arm sleeve 14. Arm piston 21 is preferably hydraulically operated, again by connections to the hydraulic system of the loader, and reciprocally extends and retracts the extension arm 13 in a linear manner out from and back into arm sleeve 14, thus extending and retracting saw blade 11 across cradle means 30.

The arm sleeve 14 is pivotally connected to the cradle means 30 or the framing 98 surrounding the cradle means 30 by support post 15. Support post 15 is also preferably constructed of a steel beam and is preferably attached perpendicular to arm sleeve 14. Pivoting means 17, preferably comprising a sleeve piston 22 having one end pivotally connected to the cradle means 30 or framing 98 and the other end to the arm sleeve 14 or support post 15, acts to pivot the saw blade assembly 10 radially in the plane transverse to the longitudinal direction of cradle means 30. Again it is preferable that sleeve piston 22 be operated hydraulically by the hydraulic system of the loader.

Preferably, a protective tower 23 surrounds the saw blade assembly 10 and is mounted lateral to cradle means 30. The protective tower 23 prevents accidental damage to the saw blade assembly 10 when it is in the recessed position. The tower 23 may be constructed from steel beams or the like, and should be relatively open to prevent entrapment of debris from the cutting operation. The side of the tower 23 facing the cradle means 30 is fully open to allow the saw blade assembly 10 to pivot upward into the retracted position and downward into the cutting position.

Moveable abutment means 24, often referred to as a butt board in the industry, is connected to the framing 98 at the cutting end of the cradle means 30. Abutment means 24 acts to align the ends of the logs 99 after they have been placed into the cradle 30 and after they have been shifted to make the next cut. Typically, abutment means 24 is a large plate raised and lowered hydraulically by one or more butt board pistons 25.

Figure 3:
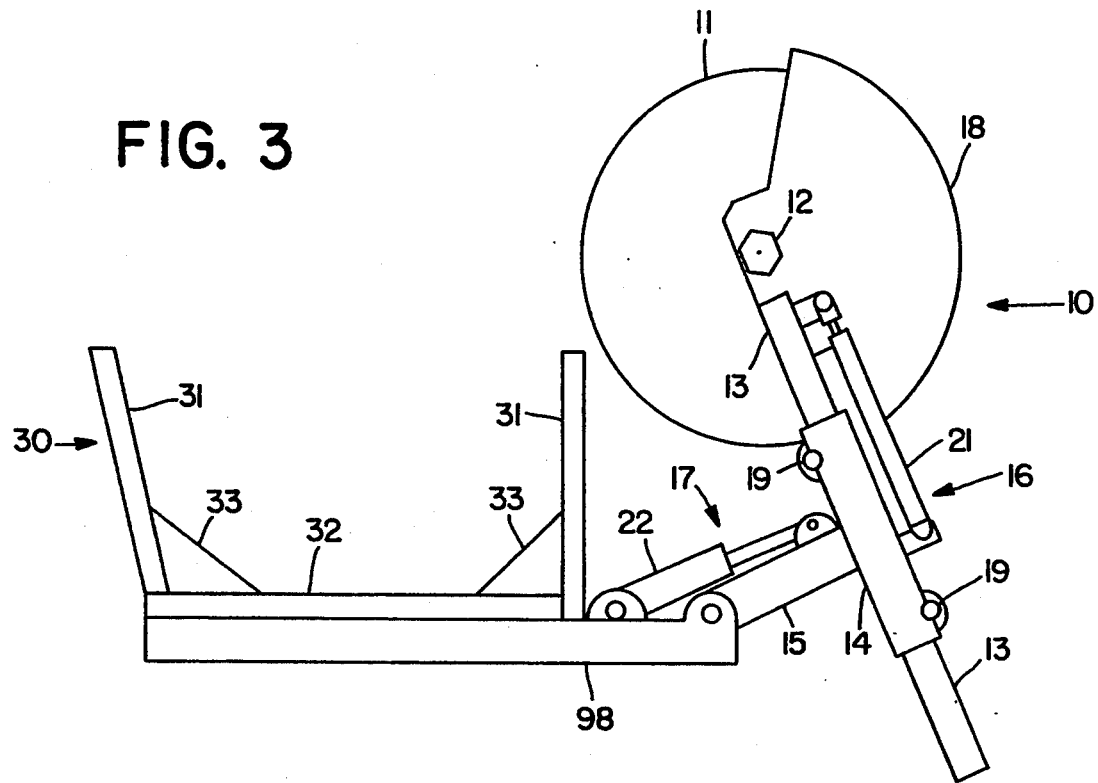
FIG. 3 is an end view showing only the saw blade and cradle, with the blade in the recessed position.
Figure 4:
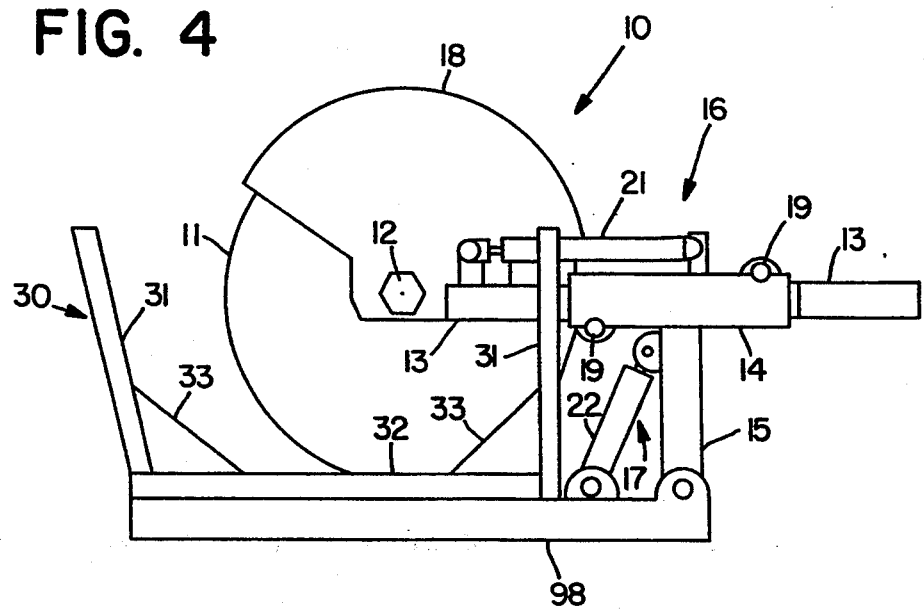
FIG. 4 is an end view showing only the saw blade and cradle, with the blade in the down cutting position.
Figure 5:
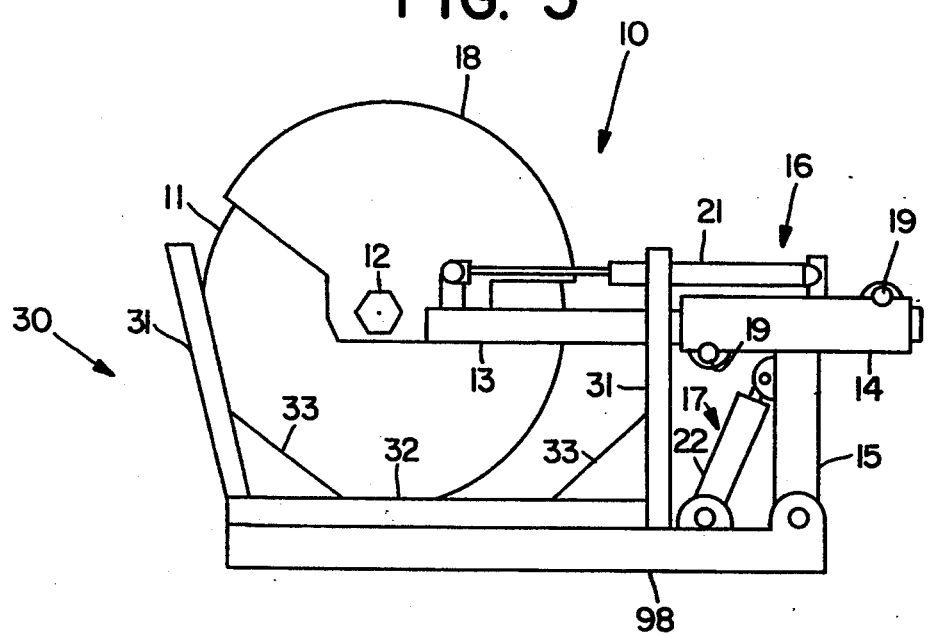
FIG. 5 is an end view showing only the saw blade and cradle, with the blade in the extended cutting position.

The operation of the invention is best illustrated by the series of FIGS. 3, 4 and 5, which show the saw blade assembly 10 and the cradle means 30, but exclude the other components of the invention. In FIG. 3, and in FIG. 1, the saw blade assembly 10 is shown in the retracted or recessed position. The complete saw blade assembly 10 is to the side of the cradle means 30, allowing the logs 99 to be placed into position. Arm piston 21 is fully retracted, so that the extension arm 13 is fully retracted into arm sleeve 14, the free end of extension arm 13 extending from the far open end of sleeve arm 14. The sleeve piston 22 is fully extended, thus pivoting the entire saw blade assembly 10 vertically and outwardly from the cradle means 30. In use, the saw blade 11 is kept rotating continuously.

Once the logs 99 are properly positioned within the cradle means 30 and evened by the abutment means 24, the operator initiates retraction of sleeve piston 22. This radially pivots the saw blade assembly 10 downward, to the point that the extension arm 13 and arm sleeve 14 are in the horizontal position, as shown in FIG. 4. As the rotating saw blade 11 enters the area defined by the cradle means 30, the logs 99 occupying the location nearest to the saw blade assembly 10 are cut during the downward radial movement of the saw blade 11.

Once the sleeve piston 22 is fully retracted so that the horizontal position is reached, the arm piston 21 is extended, thereby extending extension arm 31 from arm sleeve 14 and driving the saw blade 11 linearly across the cradle means 30, as shown in FIG. 5. This extension cuts the remainder of the logs 99 in cradle means 30. Upon reaching the full extension, the saw blade 11 is retracted by retracting arm piston 21 and the saw blade assembly 10 is pivoted upward into the recessed position by extending sleeve piston 22. Preferably, arm piston 21 and sleeve piston 22 are interrelated by valving such that the sleeve piston 22 must be fully retracted before arm piston 21 can be extended, and arm piston 21 must be fully retracted before sleeve piston 22 can be extended, although it is possible to have each operate independently. The cut segments of the logs 99 can now be removed by the loader, the remaining logs 99 pulled forward and the entire cycle repeated.

The invention enables the lateral width of cradle means 30 to exceed the diameter of saw blade 11, thereby increasing the cutting area by up to several feet. The traversing action of the saw blade 11 as accomplished by the extending means 16 in combination with the recessing action of the pivoting means 17 enables a much larger number of logs 99 to be cut by a single cutting cycle. Because the saw blade assembly 10 is fully recessed during loading, the near side of the cradle means 30 is fully accessible, and because the saw blade 11 is extended across the cradle means 30, more logs 99 can be loaded. For example, the cutting area of the invention is approximately 50 percent greater than the cutting area of the circular or chain saw type which only pivots. The cutting action of the invention is much more powerful than the type utilizing the multi-jointed elbow, since the cutting movement of the invention is first solely radial and then solely linear.

It is understood that equivalents and substitutions to elements in the above description may be apparent to those skilled in the art. The true scope and definition of the invention therefore is to be as set forth in the following claims.

I claim:

1. A circular saw device for cutting a plurality of logs disposed in a cradle means, wherein said saw device comprises:

a circular saw blade assembly comprising a circular saw blade, drive means to rotate said saw blade, an extension arm slidingly contained within an arm sleeve, extending means to extend said extension arm wherein said extending means is non-pivotally secured to said extension arm and said arm sleeve, and pivoting means to pivot said arm sleeve, wherein said saw blade is mounted in generally parallel alignment with the direction said extension arm is extended, wherein said extending means, during operation of said device, is for extending said extension arm and said saw blade across the cradle means in a direction generally perpendicular to the longitudinal axes of said logs to cut said logs into segments;

and further where said pivoting means is for pivoting said arm sleeve from an upright position downward toward the cradle means when said extension arm is fully retracted within said arm sleeve, and upward from the cradle means to the upright position.

2. The device of claim 1, where said circular saw blade assembly is mounted onto the cradle means which has a width greater than the diameter of said circular saw blade.

3. The device of claim 1, further comprising abutment means to contact and thereby align said plurality of logs.

4. The device of claim 3, where said abutment means is adjustable in distance relative to said saw blade assembly.

5. The device of claim 1, where the cradle means is U-shaped in cross-section.

6. The device of claim 1, further comprising a tower connected to said cradle means and surrounding said saw blade assembly.

7. The device of claim 1, where said extending means and said pivoting means are hydraulic pistons.

8. The device of claim 1, further comprising wheels attached to the cradle means.

* * * * *